(12) United States Patent
Andersen et al.

(10) Patent No.: US 9,683,551 B2
(45) Date of Patent: Jun. 20, 2017

(54) OPTIMIZATION OF POWER PRODUCTION IN A WIND TURBINE AT BELOW RATED POWER

(71) Applicant: VESTAS WIND SYSTEMS A/S, Aarhus N (DK)

(72) Inventors: Asger Svenning Andersen, Tjele (DK); Jesper Sandberg Thomsen, Hadsten (DK); Jacob Krogh Kristoffersen, Viby J (DK); Ib Svend Olesen, Randers (DK); Jonas Romblad, Risskov (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 361 days.

(21) Appl. No.: 14/369,524

(22) PCT Filed: Dec. 13, 2012

(86) PCT No.: PCT/DK2012/050461
§ 371 (c)(1),
(2) Date: Jun. 27, 2014

(87) PCT Pub. No.: WO2013/097852
PCT Pub. Date: Jul. 4, 2013

(65) Prior Publication Data
US 2015/0030448 A1    Jan. 29, 2015

Related U.S. Application Data

(60) Provisional application No. 61/581,652, filed on Dec. 30, 2011.

(30) Foreign Application Priority Data

Dec. 29, 2011  (DK) .................................. 2011 70762

(51) Int. Cl.
F03D 7/02        (2006.01)
F03D 7/04        (2006.01)
F03D 17/00       (2016.01)

(52) U.S. Cl.
CPC ......... *F03D 7/0256* (2013.01); *F03D 7/0224* (2013.01); *F03D 7/042* (2013.01);
(Continued)

(58) Field of Classification Search
CPC ...... F03D 7/0256; F03D 7/0224; F03D 7/042; F03D 7/046; F03D 17/00; Y02E 10/722; Y02E 10/723
See application file for complete search history.

(56) References Cited

U.S. PATENT DOCUMENTS

| 8,712,593 B2* | 4/2014 | Bjertrup | F03D 7/0224 290/44 |
| 9,014,863 B2* | 4/2015 | Olesen | F03D 7/02 416/31 |

(Continued)

FOREIGN PATENT DOCUMENTS

| WO | 2010/057737 A2 | 5/2010 |
| WO | 2011/015383 A2 | 2/2011 |

(Continued)

OTHER PUBLICATIONS

International Search Report and Written Opinion for PCT/DK2012/050461, Mar. 1, 2013.

(Continued)

*Primary Examiner* — Gregory Anderson
*Assistant Examiner* — Christopher R Legendre
(74) *Attorney, Agent, or Firm* — Patterson + Sheridan, LLP

(57) ABSTRACT

The rotor blades of a wind turbine each have a plurality of fiber-optic pressure variation sensors which can detect the (Continued)

onset of a stall condition. The output of the stall condition sensors is input to a stall count circuit which increases a stall count signal each time a stall indication is received. The stall count signal is decayed exponentially over time and the current signal is summed with the decayed signal from a previous sampling period to form a value from which a stall margin is determined. An $\lambda:\theta$ curve of tip speed to wind speed ratio $\lambda$ against pitch angle reference $\theta$ is then determined from the stall margin.

23 Claims, 6 Drawing Sheets

(52) U.S. Cl.
CPC ............. *F03D 7/046* (2013.01); *F03D 17/00* (2016.05); *Y02E 10/723* (2013.01)

(56) References Cited

U.S. PATENT DOCUMENTS

| | | | |
|---|---|---|---|
| 9,261,076 B2* | 2/2016 | Abdallah | F03D 7/0224 |
| 2006/0145483 A1 | 7/2006 | Larsen et al. | |
| 2009/0169378 A1 | 7/2009 | Menke | |
| 2010/0098540 A1* | 4/2010 | Fric | F03D 7/0224 416/36 |
| 2013/0078093 A1* | 3/2013 | Miranda | F03D 7/0224 416/1 |
| 2013/0259682 A1* | 10/2013 | Kammer | F03D 7/0224 416/1 |
| 2015/0030448 A1* | 1/2015 | Andersen | F03D 7/0224 416/1 |

FOREIGN PATENT DOCUMENTS

| | | |
|---|---|---|
| WO | 2011/117246 A2 | 9/2011 |
| WO | 2011/150931 A2 | 12/2011 |

OTHER PUBLICATIONS

DK Search Report for PA 2011 70762, dated Jul. 18, 2012.
Bianchi F.D., et al. "Optimal Gain-scheduled Control of Fixed-Speed Active Stall Wind Turbines," IET Renewable Power Generation, vol. 2, No. 4. Dec. 8, 2008, pp. 228-238.

* cited by examiner

OPTIMIZATION OF POWER PRODUCTION IN A WIND TURBINE AT BELOW RATED POWER

This invention relates to wind turbines, and more particularly, to the improvement of power production when the turbine is operating at below rated power.

When a variable speed wind turbine is operating under conditions where the rotor speed is below rated power, a collective pitch angle is set from a curve defined by the relationship between pitch angle θ and the blade tip/wind speed ratio λ that optimises the power coefficient Cp and with that gives optimal power production at below rated power. This curve is referred to hereafter as the λ:θ curve and the relationship is defined as $\lambda=\Omega R/V$ where $\Omega$ is the rotational speed of the wind turbine rotor, R is the rotor radius and V is the wind speed. An example of a typical λ:θ curve is shown in FIG. 1. Pitch control in commercial scale wind turbines is well known and a collective pitch reference is a control signal applied to all of the rotor blades, usually three in modern commercial horizontal axis wind turbines.

As can be seen from FIG. 1, the wind speed is a variable to which the turbine must react and, when below rated power, the power production is optimised by setting a rotational speed reference in accordance with the measured mean wind speed. The speed reference is followed by adjusting the output power. The result is a certain tip/wind speed ratio and to achieve that ratio the collective pitch angle is adjusted in accordance with the curve of FIG. 1.

When the angle of attack α of a wind turbine blade is varying, there will be a threshold value $\alpha_s$ above which the blade may stall. Stall results in increased acoustic noise emissions and an increase in loading. The actual onset of stall will also depend on the air conditions. For example, pressure and turbulence. Due to fast fluctuations in the wind speed and direction, particularly under turbulent conditions, the angle of attack will vary independently of the pitch angle set according to the λ:θ curve of FIG. 1. These variations must be taken into account when deriving the curve in order to avoid or reduce excessive blade stall. Thus, the curve derived should define a nominal stall margin in zero turbulence to avoid excessive stall occurring, for example, under conditions of high turbulence. The stall margin β may be defined as $\alpha_s-\alpha_0$, where $\alpha_0$ is the angle of attack under zero turbulence conditions. The stall margin is illustrated in FIG. 2 which shows a lift curve for a wind turbine blade plotted as angle of attack α on the x axis against lift coefficient $C_L$ an the y axis. This graph suggests that the curve of FIG. 1 should be defined conservatively to reduce stall to a minimum level.

While reducing stall is important and necessary, adopting a conservative λ:θ curve cannot optimise the power produced below rated power. It is, therefore, an aim of the present invention to reduce the stall margin so as to enable power production below rated power to be increased where possible.

According to the invention there is provided a method of operating a wind turbine at below rated power, comprising sensing stall conditions using one or more stall condition sensors on the wind turbine rotor blades, determining a stall margin based on the sensed stall conditions, selecting a curve of tip to wind speed ratio against blade pitch angle according to the determined stall margin, and varying the blade pitch angle of at least one of the wind turbine blades in accordance with the selected curve.

The invention also provides a control system for operating a wind turbine at below rated power, comprising one or more stall condition sensors for sensing stall conditions on the wind turbine rotor blades, a stall margin determination arrangement for determining a stall margin based on sensed stall conditions, a controller for selecting a curve of tip to wind speed ratio against rotor blade pitch angle according to the determined stall margin, and a pitch angle controller for varying the blade pitch angle of at least one of the rotor blades in accordance with the selected curve.

Embodiments of the invention have the advantage that the stall margin may be determined adaptively depending on the rate at which stall conditions are detected by the at least one stall sensor. In turn, this means that the power produced by the turbine can be optimised by selecting an aggressive tip speed/wind speed ratio against pitch angle reference curve at which to operate the wind turbine when wind conditions permit.

Preferably, the determination of the stall margin comprises determining a stall event count/measure using a stall event counter. The determination is based on outputs from the one or more stall condition sensors with the stall margin being determined from the stall event count/measure. The stall event count/measure is dependent on the time between detected stall conditions output by the at least one stall sensor.

In one embodiment, the stall event counter increases the stall event count/measure on detection of a stall condition by the at least one stall condition sensor and decays the stall event count/measure over time. This embodiment has the advantage that the stall event count/measure, which determines the stall margin, is responsive to the relative timing of stall events detected by the at least one stall condition sensor.

In one embodiment an output from the at least one stall condition sensor is processed to determine an increase in a stall event signal, and scaled by an amount determined according to wind conditions.

In one embodiment the processed and scaled output is summed with the processed and scaled output from a previous sampling time period weighted by an amount determined according to wind conditions.

In one embodiment, the summed outputs are mapped to form a stall margin and the stall margin is used to select the curve of tip speed to wind speed ratio against collective blade pitch angle.

In one embodiment, a first constant is determined on the basis of wind speed and wind turbulence, the first constant is used to scale the increase in the stall event signal.

In one embodiment, the stall margin is varied between a nominal value and an optimal value depending on the stall event counter output. This enables the turbine to be operated, below rated power conditions, adaptively between a nominal output and an optimal output depending on the detected stall events and measures of the effect of those stall events on parameters such as emitted acoustic noise.

In one embodiment, the at least one stall condition sensor comprises a plurality of stall condition sensors on each of the rotor blades of the wind turbine. These sensors can be fibre-optic pressure variation sensors and in one embodiment, comprise a membrane arranged over an aperture in a blade surface and a fibre-optic light transmitter and a fibre-optic light receiver arranged within the aperture to detect vibration of the membrane by detecting fluctuations in the intensity of light received by the fibre-optic light receiver. These fluctuations in intensity are caused by vibration of the membrane which, in turn, is caused by turbulence and is indicative of a stall condition. Such sensors have the advantage of being rugged, relatively cheap to install, and reliable.

In one embodiment the pitch angle controller is a common pitch angle controller for varying of the blade pitch angle of the wind turbine blades in accordance with the selected curve by a common amount.

Embodiments of the invention will now be described, by way of example only, and with reference to the accompanying drawings, in which:

FIG. 1, (referred to above) shows a typical λ:θ curve for a wind turbine below rated power;

FIG. 2, (referred to above) shows a lift curve for a typical wind turbine blade;

Figure 1:
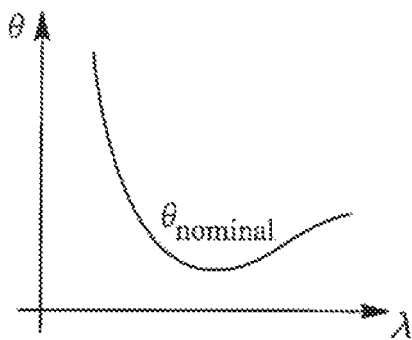
Figure 2:
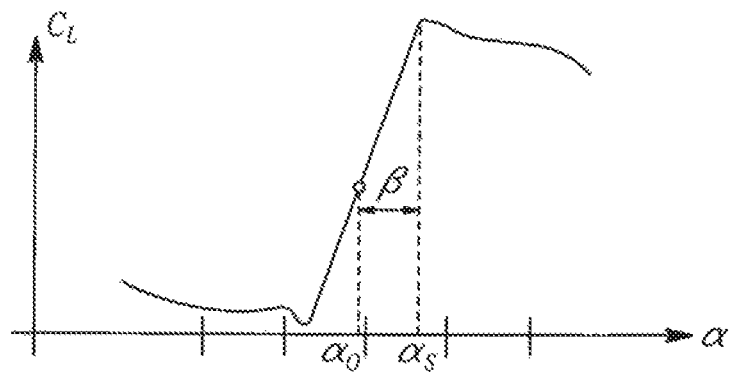
Figure 3:
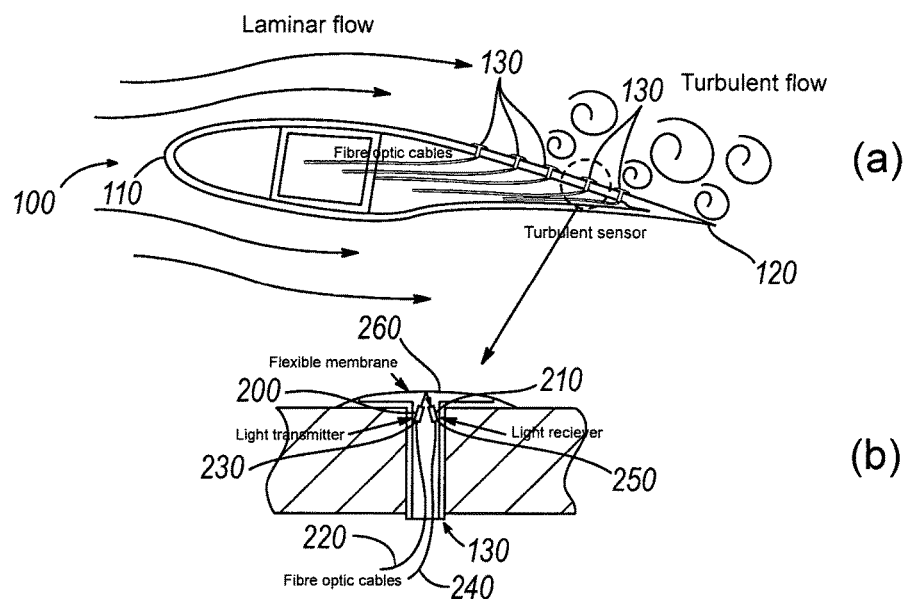
FIG. 3a and FIG. 3b show a fibre-optic pressure variation gauge for detecting blade stall.

In the embodiments of the invention to be described, the stall margin is adaptively controlled in response to sensed wind conditions. However, for this to be possible it is necessary to be able to determine accurately the likelihood of stall occurring. FIG. 3 illustrates a stall sensor which may be used for this purpose. It is to be understood that this sensor is exemplary and that other stall sensors, either direct or indirect, may be used. The stall sensor of FIG. 3 is described firstly in WO-A-2011/015383 the contents of which are incorporated herein by reference. FIG. 3 shows one embodiment of the disclosure of WO-A-2011/015383. FIG. 3a shows a wind turbine blade 100 in cross section with air flowing over the aerodynamic surface from the leading edge 110 to the trailing edge 120. Initially, the flow will be laminar, but at some point along the upper surface the laminar flow will detach and the flow will become turbulent, potentially leading to a stall. The point at which the flow transitions from laminar to turbulent will depend on many factors including angle of attack, pitch angle, wind speed, condition of the air and the condition of the blade surfaces.

A plurality of turbulence sensors 130 are arranged along the upper surface of the blade over the rear half of the blade approaching the trailing edge. As described fully in WO-A-2011/015383, the sensors are placed at points along the blade where the boundary layer is likely to separate and a stall initiated. FIG. 3b shows one of the turbulence sensors in more detail. The sensor comprises a pair of fibre-optic devices 200, 210. The first device comprises a fibre-optic cable 220 and a light transmitter 230 and the second device comprises a fibre-optic cable 240 and a light receiver 250. The two devices are arranged within a small aperture in the blade surface. Due to the size of the fibre-optic cables, this aperture may be as small as 5 mm diameter or less. The fibre-optic cables extend into the interior of the blades with the light transmitter 230 and light receiver 240 positioned at the edge of the aperture. A flexible or resilient membrane 260 is placed across the aperture supported above the aperture as shown in FIG. 3b. The membrane is sensitive to pressure variations caused by turbulent air flow across the upper surface of the blade and will vibrate both depending on the wind speed and the degree of turbulence. The light transmitter 230 and light receiver 240 are positioned such that light from the transmitter 230 is reflected off the inner surface of the membrane 260 to the receiver 240. The light received by the receiver will depend on the vibrations of the membrane and constructive and destructive interference between the transmitted and received light will lead to fluctuations in light intensity at the receiver which can be monitored to determine the level of vibration of the membrane and, from that, can be calibrated to measure the turbulence of the blade surface and function as a stall detector. As multiple sensors are used at key points of the blade, the collective signals from all these sensors can be used to detect the onset of a stall and the development of a stall over the blade surface.

In FIG. 3, a plurality of stall sensors are arranged along the cross section of the blade, on the upper blade surface. As explained below, these sensors are used as the basis of an adaptive control algorithm of the stall margin which, in turn, enables a more aggressive λ:θ curve to be derived and so enables greater power production below rated power conditions.

We have appreciated that under benign wind conditions where wind turbulence is low and wind direction is relatively constant, a smaller stall margin is acceptable without compromising emitted acoustic noise. That is, under those conditions, there is a lower likelihood of stalls commencing leading to the emission of noise. Thus, under these conditions, the turbine can be run with a more aggressive λ:θ curve. Where conditions are less benign with a more turbulent airflow and more variation in wind direction, the λ:θ curve is less aggressive.

Figure 4:
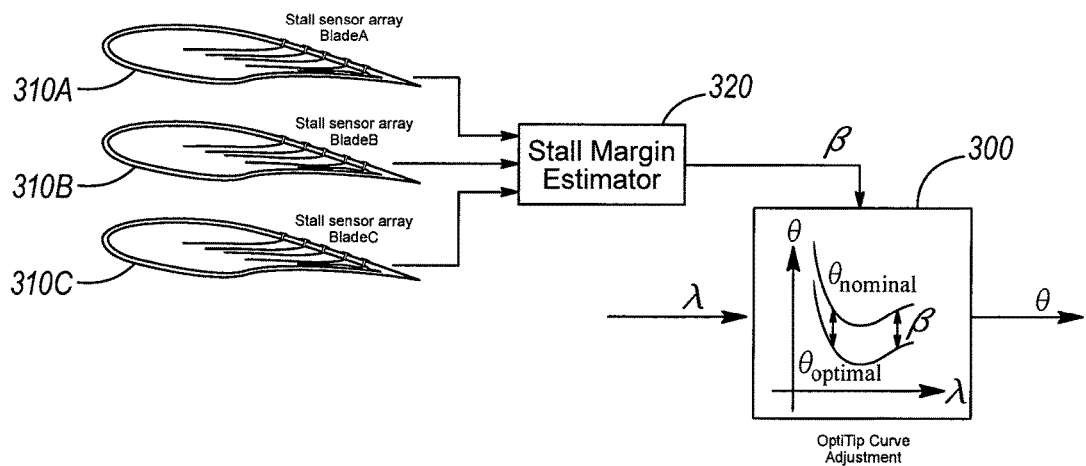
FIG. 4 shows, schematically, an embodiment of the invention which estimates a stall margin.

FIG. 4 shows, schematically, how a stall margin estimator is used to provide an input to an λ:θ curve calculator 300. In FIG. 4, each of the turbine rotor blades 310 A, B and C has an array of stall sensors as described with respect to FIG. 3 above. The outputs of these stall sensors are provided to a stall margin estimator 320 which analyses the stall sensor outputs and determines the appropriate stall margin for the conditions sensed and then outputs a stall margin β signal to the λ:θ calculator 300.

The λ:θ calculator 300 receives the tip/wind speed ratio λ as its other input and calculates the appropriate collective pitch reference signal θ as its output.

In the arrangement in FIG. 4, the stall margin estimator 320 estimates the margin of stall β based on the signals from the multiple stall detectors on each of the blades.

When a high stall margin is estimated, the λ:θ curve at 300 is adjusted aggressively towards an optimum curve which can maximise power output. However, when a low stall margin is estimated, the adjustment is more conservative towards a nominal curve. Thus, in practice, the blades are pitched more into the wind when a high stall margin is estimated, indicating a lower likelihood of stall and benign conditions, than under normal conditions when a lower stall margin is estimated. Thus, under the high stall margin conditions, more power can be extracted from the wind than under normal operating conditions.

Figure 5:
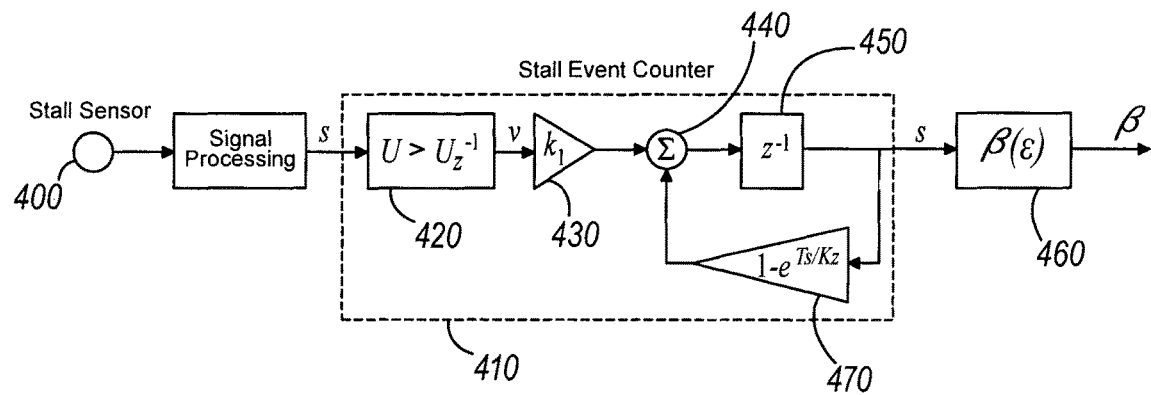
FIG. 5 is a block diagram showing the stall margin estimator of FIG. 4.

FIG. 5 shows the stall estimator in greater detail. It is to be understood that this is only an example of how the stall estimator has been constructed and other variations are possible and will occur to those skilled in the art.

In FIG. 5, the input s is the output from the stall sensor described in FIG. 3. This may be multiple inputs, one from each sensor or a simple input indicative of a sensed stall by any of the sensors. In this embodiment the input s of the signal processing block 405 is binary and will be zero unless any of the sensors detect a stall in which case the input will be 1. Other analog or digital input configurations could be used. Although FIG. 4 shows an array of sensors on each blade, a single sensor on each blade could be used. For each of these there is an instance of the Stall Event Counter so that the stall margin β is estimated for each blade. In one example, the minimum of the three stall margin estimates is used to adapt the curve, and therefore the collective pitch angle in the manner described below. In another example, three instances of the λ:θ curve may be determined, one for each blade, each curve being based on a single sensor or an array of two or more sensors. Each instance of the curve may be used to set an individual pitch angle for a blade instead of a collective pitch angle and the control signal applied to the pitch controller is therefore an individual blade pitch control signal for each blade.

When a stall event is detected, by the stall sensor 400, a stall event counter 410, which has a value c having an exponential decay is increased by a constant $k_1$ and then reduced towards zero at a rate dependent on a second constant $k_2$. Thus, if several stall events are detected over a relatively short period of time, for example from several sensors on different blades, the value of ϵ will increase drastically. If the period between stall events is relatively long, c will remain relatively low.

The stall event counter in FIG. 5 is a discrete-time implementation in which $T_s$ is the sample time, $Z^{-1}$ is one sample delay block and $U > U_z^{-1}$ is a logic operator detecting an increase in the sensor signal. Thus, an output from the stall sensor 400 provides the input s to logic operator 420 which determines on the basis of the input from the sensor, whether the number of stall events is greater than in the previous time period, for example, by incrementing a counter. The logic operator produces an output of which is multiplied by a constant at amplifier 430, the output of which provides an input to a summer 440. The output of the summer is input into a time delay 450 equal to one sample delay and the delayed output provides the stall event counter signal c from which the stall width is calculated at block 460. The output of the delay 450 also form the input to an amplifier 470 which multiplies the delayed value by an amount $(1-e^{Ts/Kz})$ to provide a second input to the summer 440. This amplifier provides the exponential decay.

Figure 6:
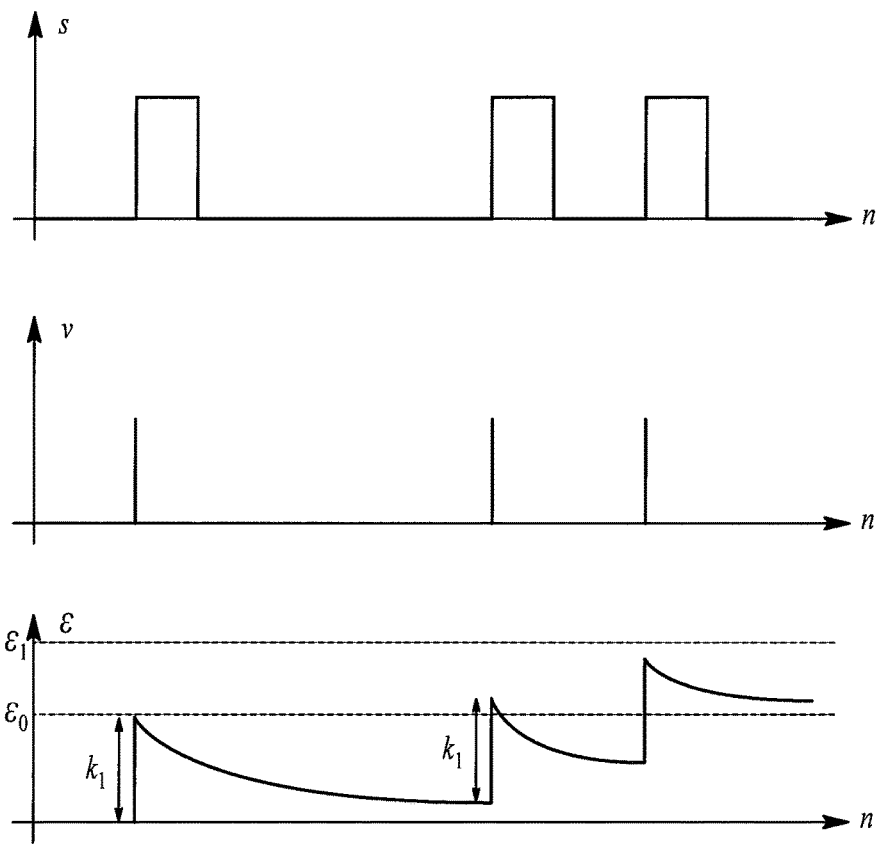
FIG. 6 illustrates how counting stall events may be used to adjust a pitch reference.

The effect of the stall event counter can be seen in FIG. 6. In this figure, graph a) shows the output S of the stall counter against the number of sample times n; graph b) shows the output of logic operator $U > U_z^{-1}$ 420 over this period; and graph c) shows the stall event count signal ϵ. Graph a) shows that the input s to the counter has gone high in three separate time periods which produces a high output v from the logic operator 420. In Figure c) the magnitude of the increase in the stall event count signal ϵ for each detected stall event is equal to the first constant $k_1$. The value of ϵ then decays exponentially until the next high output from the logic operator 420. In this example the second and third events are close together and so the value of ϵ after the second event has only decayed to about half its value at the time of the third event so that the value of ϵ rises above a threshold value $\epsilon_0$ which it remains above for some time until it decays below $\epsilon_0$ in the absence of a further event.

Figure 7:
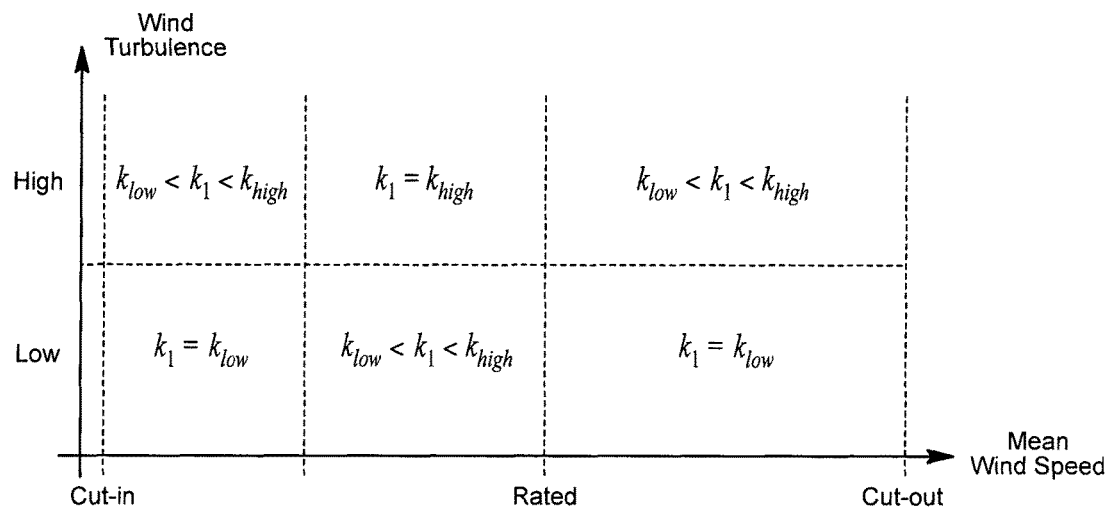
FIG. 7 shows how stall event counter constants may be adaptively adjusted in dependence upon wind turbulence and mean wind speed.

The values of $k_1$, $k_2$ are dependent on wind conditions and can be adapted continuously to increase or decrease the weight given to the detection of stall events to the stall event counter. This may be done in correspondence with measured emitted acoustic noise and/or measured loads due to stall events. FIG. 7 shows how $K_1$ may be adapted on the basis of emitted acoustic noise. FIG. 7 is a graph of mean wind speed against turbulence. Mean wind speed on the x axis has three critical values: cut-in where the speed is high enough for the rotor to start turning and generating power; rated, at which the turbine outputs its rated power value; and cut-out, where the wind speed is too high for safe operation or the turbine operation is shut down, for example, by feathering the blades or yawing the rotor out of the wind.

In FIG. 7, six different regions are defined and the tuning considerations are as follows:

| Region 1 | |
| --- | --- |
| Wind speed above cut-in but well below rated wind speed. Turbulence is low. | The risk of stall events is low and the influence of stall events or emitted noise is low, $k_1$ is therefore set relatively low. |
| Region 2 | |
| The wind speed is well above cut-in but below rated. Turbulence is low. | The risk of stall events is low but the influence of stall events on emitted acoustic noise is high. $k_1$ is therefore set in an intermediate region. |
| Region 3 | |
| Mean wind speed is above rated, but below cut-out, and turbulence is low. | The risk of stall event is low and the influence of stall on acoustic noise is low. $k_1$ is therefore set low. |
| Region 4 | |
| The mean wind speed is above cut-in but well below rated. Turbulence is high. | The risk of stall events is high but those events have a low influence on acoustic noise. $k_1$ is set to an intermediate region. |
| Region 5 | |
| The mean wind speed is well above cut-in, but below rated. Turbulence is high. | Both the risk of stall events and the influence of those events on acoustic noise levels is high. $k_1$ is therefore set relatively high. |
| Region 6 | |
| The mean wind speed is above rated, but below cut-out and turbulence is high. | The risk of stall events is high but those events have a low influence on acoustic noise. $k_1$ is set to an intermediate region. |

Figure 8:
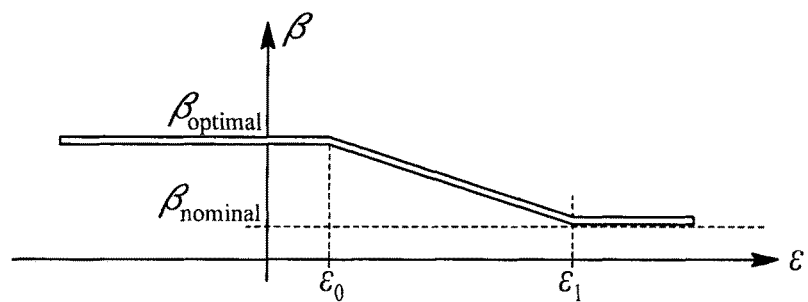
FIG. 8 is a graph of stall events against stall margin.

As can be seen from FIG. 6, the stall event counter has three ranges of values: below $\epsilon_0$; between $\epsilon_0$ and $\epsilon_1$; and above $\epsilon_1$. The value of ϵ is mapped to the stall margins by mapping function 460 in FIG. 5. An example of a suitable mapping is illustrated in FIG. 8 from which it can be seen that:

where $\epsilon < \epsilon_0$, the stall counter is relatively low and the optimum λ:θ curve may be used to optimise power production;

where $\epsilon_0 \leq \epsilon \leq \epsilon_1$, the stall counter is in an intermediate region in which an λ:θ curve between the optimum and a nominal curve should be used to find a trade-off between optimal power production and indication of emitted acoustic noise;

where $\epsilon > \epsilon_1$, the stall counter is relatively high and the nominal λ:θ curve should be used to limit the emitted acoustic noise.

Figure 9:
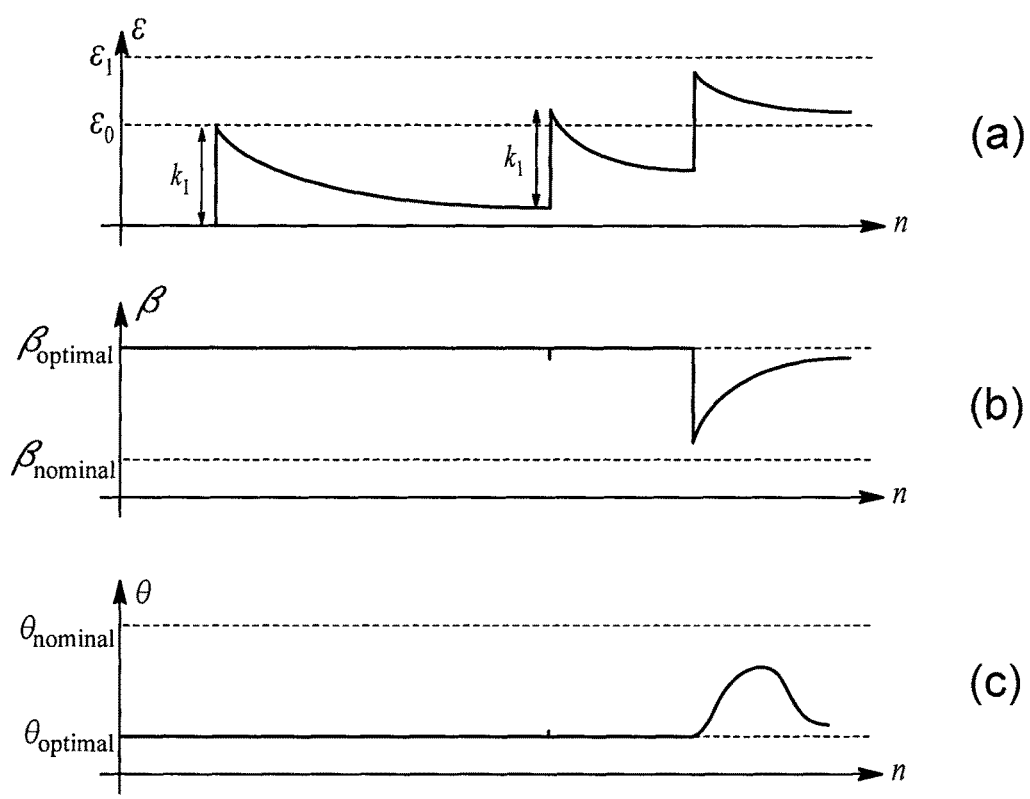
FIG. 9 shows how a stall event count may be mapped to a stall margin and converted to a collective blade pitch reference.

FIG. 9 shows an example of how the value of ϵ in FIG. 9a may be mapped to the stall margin β in FIG. 9b and the common blade pitch reference θ in FIG. 9c. The graph of stall rate count in FIG. 9a is that of FIG. 6c repeated for ease of comparison. Thus, it can be seen that the stall margin and the pitch reference are maintained at optimal except for a momentary excursion when the second event caused the value of ϵ to exceed $\epsilon_0$. However, as this decays away the optimal values are resumed until the third event where the value of ϵ exceeds $\epsilon_0$ but remains above $\epsilon_0$ while it decays. This causes a drop in β towards β nominal and a gradual recovery towards β optimal. At this point the pitch reference increases from the optimal value towards the nominal value and then returns towards the optimal value following the defined mapping of stall margin to pitch reference for a given λ, referred to in FIG. 4 as the λ:θ adjustment. The adjustment in pitch reference may be made continuously, without discrete steps, by introducing a rate limiter on the stall margin signal. The mapping may be implemented as a look up table stored in memory within the turbine controller.

The embodiment described may be implemented within a wind turbine controller or even at a higher level on a wind park controller that controls more than one wind turbine. Existing wind turbine controllers include a component which calculates the optimum collective pitch angle depending on the relationship between pitch angle and rotor speed. The embodiment described may conveniently be implemented as a modification of the existing pitch angle control system.

Thus, by accurate measurement of stall events using stall sensors at suitable locations on the upper surface of the blades, the stall margin applied to the curve of pitch reference against tip/wind speed ratio can be controlled such that the power output from the turbine can be optimised when the risk of stall is low and the stall margin can be adaptively controlled according to the risk of stall and the effect of stall on a parameter such as emitting acoustic noise, or controlling blade loads, which are desirable to control.

As well as enabling optimisation of energy generation at below rated wind speed, embodiments of the invention can also reduce maintenance costs as blades are prevented from operating continuously in the stall region. Moreover, the use of fibre-optic sensors, as described with respect to FIG. 3, while not essential, has the advantage that they are low cost and reliable which is highly desirable in a wind turbine which may be located in an inaccessible location.

Many modifications to the embodiments described are possible and will occur to those skilled in the art without departing from the scope of the invention which is defined by the following claims.

What is claimed is:

1. A method of operating a wind turbine at below rated power, comprising:
    sensing stall conditions using one or more stall condition sensors on wind turbine rotor blades;
    determining a stall margin based on the sensed stall conditions, wherein the determination of the stall margin comprises determining a stall event count using a stall event counter based on outputs from the one or more stall condition sensors, the stall margin being determined from the stall event count, wherein the stall event count is dependent on the time between detected stall conditions output by the at least one stall condition sensor;
    selecting a curve of tip to wind speed ratio against blade pitch angle according to the determined stall margin; and
    varying the blade pitch angle of at least one of the wind turbine blades in accordance with the selected curve.

2. A method according to claim 1, wherein the stall event counter increases the stall event count on detection of a stall condition by the at least one stall condition sensor, and decays the stall event count over time.

3. A method according to claim 2, wherein an output from the at least one stall condition sensor is processed to determine an increase in a stall event signal, and scaled by an amount determined according to wind conditions.

4. A method according to claim 3, wherein the processed and scaled output is summed with a processed and scaled output from a previous sampling time period weighted by an amount determined according to wind conditions.

5. A method according to claim 4, wherein the summed outputs are mapped to a stall margin and the curve of tip speed to wind speed ratio against blade pitch angle determined from the mapped stall margin.

6. A method according to claim 5, wherein the stall margin is varied between a nominal value and an optimal value depending on the stall event count output.

7. A method according to claim 3, wherein a first constant is determined on the basis of wind speed and wind turbulence, and the first constant is used to scale the increase in the stall event signal.

8. A method according to claim 1, wherein the at least one stall condition sensor comprises a plurality of stall condition sensors on each of the rotor blades of the wind turbine.

9. A method according to claim 8, wherein the stall condition sensors are fibre-optic pressure variation sensors.

10. A method according to claim 9, wherein the fibre-optic pressure variation sensors comprise a membrane arranged over an aperture in a blade surface and a fibre-optic light transmitter and a fibre-optic light receiver arranged within the aperture to detect vibration of the membrane by detecting fluctuations in the intensity of light received by the fibre-optic light receiver.

11. A method according to claim 1, wherein the varying of the blade pitch angle of at least one of the wind turbine blades in accordance with the selected curve varies the pitch angle of all the blades by a common amount.

12. A control system for operating a wind turbine at below rated power, comprising:
    one or more stall condition sensors for sensing stall conditions on wind turbine rotor blades;
    a stall margin determination arrangement for determining a stall margin based on sensed stall conditions, wherein the arrangement for determining the stall margin comprises a stall event counter for determining a stall event count based on outputs from the one or more stall condition sensors, the stall margin being determined from the stall event count and the stall event count being dependent on the time between detected stall conditions output by the at least one stall condition sensor;
    a controller for selecting a curve of tip to wind speed ratio against rotor blade pitch angle according to the determined stall margin; and
    a pitch angle controller for varying the blade pitch angle of at least one of the rotor blades in accordance with the selected curve.

13. A control system according to claim 12, wherein the stall event counter increases the stall event count on detection of a stall condition by the at least one stall condition sensor, and decays the stall event count over time.

14. A control system according to claim 13, wherein the stall event counter determines an increase in a stall event signal from the at least one stall condition sensor, and the stall event signal is scaled according to wind conditions.

15. A control system according to claim 14, comprising a summer for summing the scaled stall event signal with a scaled stall event signal from a previous sampling time period weighted by an amount determined according to wind conditions.

16. A control system according to claim 15, comprising a device storing a map of stall margins and corresponding curves of tip speed to wind speed ratio against blade pitch angle.

17. A control system according to claim 16, wherein the stall margin is varied between a nominal value and an optimal value depending on the stall event count.

18. A control system according to claim 14, wherein a first constant is determined on the basis of mean wind speed and wind turbulence, and the first constant is used to scale the increase in the stall event signal.

19. A control system according to claim 12, wherein the at least one stall sensor comprises a plurality of stall condition sensors on each of the rotor blades of the wind turbine.

20. A control system according to claim 19, wherein the stall condition sensors are fibre-optic pressure variation sensors.

21. A control system according to claim 20, wherein the fibre-optic pressure variation sensors comprise a membrane arranged over an aperture in a rotor blade surface and a fibre-optic light transmitter and a fibre-optic light receiver arranged within the aperture to detect vibration of the membrane by detecting fluctuations in the intensity of light received by the fibre-optic light receiver.

22. A control system according to claim 12, wherein the pitch angle controller is a common pitch angle controller for varying of the blade pitch angle of the wind turbine blades in accordance with the selected curve by a common amount.

23. A wind turbine having a control system according to claim 12.

* * * * *